United States Patent [19]  
Brown et al.

[11] Patent Number: 4,980,136  
[45] Date of Patent: Dec. 25, 1990

[54] PRODUCTION OF LITHIUM METAL GRADE LITHIUM CHLORIDE FROM LITHIUM-CONTAINING BRINE

[75] Inventors: Patrick M. Brown, Exton; Susan J. Beckerman, Phoenixville, both of Pa.

[73] Assignee: Cyprus Foote Mineral Company, Malvern, Pa.

[21] Appl. No.: 380,089

[22] Filed: Jul. 14, 1989

[51] Int. Cl.$^5$ .................... B01D 11/04; C01D 15/04
[52] U.S. Cl. ................. 423/179.5; 423/181
[58] Field of Search ............ 423/179.5, 181, DIG. 14; 210/634

[56] References Cited

U.S. PATENT DOCUMENTS

| | | | |
|---|---|---|---|
| 2,969,275 | 1/1961 | Garrett | 423/283 |
| 3,111,383 | 11/1963 | Garrett | 423/283 |
| 3,268,289 | 1/1981 | Macey | 423/179.5 |
| 3,278,260 | 10/1966 | Hermann | 423/179.5 |
| 3,297,737 | 1/1967 | Weck | 423/179.5 |
| 3,336,115 | 8/1967 | Reburn | 23/296 |
| 3,370,093 | 2/1968 | Longoria III | 558/290 |
| 3,410,653 | 11/1968 | Theodore | 423/181 |
| 3,479,294 | 11/1969 | Weck | 252/180 |
| 3,789,059 | 1/1974 | Cuevas | 423/179.5 |
| 3,855,392 | 12/1974 | Folkestad | 423/497 |
| 4,243,392 | 1/1981 | Brown et al. | 23/295 S |
| 4,261,960 | 4/1981 | Boryta | 423/179.5 |
| 4,261,961 | 4/1981 | Davis | 423/181 |
| 4,271,131 | 6/1981 | Brown | 423/179.5 |
| 4,274,834 | 6/1981 | Brown | 23/302 R |
| 4,324,771 | 4/1982 | Barlow et al. | 423/283 |

FOREIGN PATENT DOCUMENTS 115415 12/1963 Fed. Rep. of Germany .

OTHER PUBLICATIONS

D. S. Arnold–"Process Control in Boric Acid Extraction", 12-5-66.
D. S. Arnold "A New Process for the Production of Boric Acid", 10-23-64.
C. R. Havighorst "AP & CC New Process Separates Borates From Ore by Extraction", 11-11-63.
R. R. Grinstead "Removal of Boron and Calcium from Magnesium Chloride Brines by Solvent Extraction", 11-4-72; Indus. Eng. Chem. Dev., vol. 11, No. 4, 1972 pgs. 454-460.
N. C. Nelson and J. E. Hudgens "Liquid-Liquid Extraction of Boric Acid Using Aliphatic Alcohols'-'—Quarterly Progress Report for Period ending Mar. 31, 1953, New Brunswick Lab., pp. 24-32-34.
W. F. Linke "Solubilities Inorganic & Metal-Organic Compounds", American Chemical Society, Washington, DC-1965, pp. 394-395.
Kozerchuk et al. "Extracting Boron From Magnesium Chloride Brines", 1981.
Kristanova et al. "Extraction of Boronfrom Bulgarian Natural Brines with Two-Ethylhexanol"-1984.
Petrov et al. "Removal of Boron from Magnesium Chloride Solutions by Liquid Extraction"-1977.
Smirnov et al. "Development of Technology for Extracting Boron from Hydro Minerals"-1982.
Sologubenko et al. "Study of the Extraction Purification of Magnesium Chloride Solutions by Removing Boron"-1980.

Primary Examiner—Jeffrey E. Russel  
Assistant Examiner—Brian M. Bolam  
Attorney, Agent, or Firm—Howson and Howson

[57] ABSTRACT

The present invention relates to a novel process for producing, from a lithium-containing brine, a substantially pure lithium chloride product. This product is particularly useful for the production of lithium metal by electrolysis.

21 Claims, No Drawings

PRODUCTION OF LITHIUM METAL GRADE LITHIUM CHLORIDE FROM LITHIUM-CONTAINING BRINE

The present invention relates to a novel process for producing, from lithium-containing brine, substantially pure lithium chloride, which may be used in the production of lithium metal.

TABLE

| | Ocean | Dead Sea Israel | Great Salt Lake Utah | Bonneville Utah | Geothermal Salton Sea California | Silver Peak Nevada | Atacama Brine Chile |
|---|---|---|---|---|---|---|---|
| Na | 1.05 | 3.0 | 7.0 | 9.4 | 5.71 | 6.2 | 7.17 |
| K | 0.038 | 0.6 | 0.4 | 0.6 | 1.42 | 0.8 | 1.85 |
| Mg | 0.123 | 4.0 | 0.8 | 0.4 | 0.028 | 0.02 | 0.96 |
| Li | 0.0001 | 0.002 | 0.006 | 0.007 | 0.022 | 0.02 | 0.15 |
| Ca | 0.040 | 0.3 | 0.03 | 0.12 | 2.62 | 0.02 | 0.031 |
| $SO_4$ | 0.25 | 0.05 | 1.5 | 0.5 | 0.00 | 0.71 | 1.46 |
| Cl | 1.900 | 16.0 | 14.0 | 16.0 | 15.06 | 10.06 | 16.04 |
| Br | 0.0065 | 0.4 | 0.0 | 0.0 | 0.0 | 0.002 | 0.005 |
| B | 0.0004 | 0.003 | 0.007 | 0.007 | 0.039 | 0.005 | 0.04 |
| Li/Mg | 1/12720 | 1/2000 | 1/135 | 1/60 | 1/1.3 | 1/1 | 1/6 |
| Li/K | 1/3800 | 1/300 | 1/70 | 1/90 | 1/71 | 1/20 | 1/12 |
| Li/Ca | 1/400 | 1/150 | 1/5 | 1/17 | 1/119 | 1/1 | 1/0.2 |
| Li/B | 1/4 | 1/1.5 | 1/1.2 | 1/1 | 1/1.8 | 1/0.25 | 1/0.27 |

SALINE BRINE ANALYSES
Weight Percent

BACKGROUND OF THE INVENTION

Lithium metal has a variety of industrial uses, including applications for aluminum-lithium alloys. Additional uses of this metal include lightweight, compact primary and secondary lithium batteries, compact lithium/sulfur batteries for electric cars and power plant load leveling products Lithium metal is also employed as a degasifier in the production of high-conductivity copper and bronze and in the synthesis of organometallic compounds for applications in the fields of rubber, plastics and medicines.

Lithium metal is generally produced by electrolysis of an eutectic mixture of highly pure molten lithium chloride and potassium chloride. The lithium chloride for metal applications has been conventionally produced according to several methods. In one method lithium chloride is produced by directly reacting hydrochloric acid with lithium carbonate produced from spodumene as its genesis. However, lithium chloride produced in this manner contains substantial contaminants which are not suitable for many of the present applications of lithium metal.

To obtain highly purified lithium chloride suitable for all lithium metal applications, another method involves converting lithium carbonate to lithium hydroxide. This process requires considerable effort to generate a highly pure form of lithium hydroxide. Lithium hydroxide produced in this way is subsequently reacted with purified hydrochloric acid and evaporated to dryness to produce highly pure lithium chloride. While this method is technically viable, it is far more costly than yet another method involving the production of lithium chloride directly from naturally occurring lithium chloride brines.

Direct production of high purity lithium chloride from brine, however, is not a simple process. Naturally occurring brines found, e.g., in the United States and Chile, contain reasonable concentrations of lithium, in the form of lithium chloride Some of these brines have high concentrations of lithium and a low magnesium to lithium ratio, generally about 1:1 to 6:1, which allow for concentrating, purifying and recovering lithium chloride brine While these brines are viable reserves for lithium recovery, they also contain varying amounts of alkali and alkaline earth metal impurities, such as, magnesium, calcium, sodium, sulfate, boron, and other components. Some typical components of naturally occurring brines are identified in the Table below entitled "Saline Brine Analyses".

These metal ion contaminants in lithium containing natural brines, should be substantially eliminated or minimized to produce a lithium chloride product suitable for production by electrolysis of an uncontaminated lithium metal. During electrolysis of lithium chloride to produce lithium metal, contaminating metal ions report to the lithium metal due to the high electrode potential required for reduction of lithium. Also any contaminating anion in the lithium chloride which is not oxidized at the anode to form a volatile species will build up in the electrolyte and eventually cause substantial losses in current efficiency. For example, estimates have been made that concentrations in excess of about 100 ppm of borate ion or about 25 ppm of boron present in the lithium chloride produced via brine production technology are not satisfactory for long term electrolytic cell operation.

Simple technical means for the removal of all of these contaminants from the ultimately produced lithium metal or from the lithium chloride brines are currently not cost effective. As presently practiced in the industry, boron is removed from, or substantially reduced in, lithium chloride brine on a commercial basis by first converting the lithium chloride brine containing substantial impurities into lithium carbonate via a process of precipitation of lithium carbonate with soda ash. The lithium carbonate is subsequently converted to lithium hydroxide by lime treatment of lithium carbonate to produce lithium hydroxide and waste calcium carbonate. Crystallization of the lithium hydroxide substantially removes the boron and alkali metal impurities by way of a bleed stream. The lithium hydroxide is then treated with hydrochloric acid to produce lithium chloride or treated with $CO_2$ to produce high purity lithium carbonate. These conversions are accomplished according to the following series of reactions:

$$2LiCl + Na_2Co_3 \rightarrow 2NaCl + Li_2CO_3 \quad (1)$$

$$Li_2CO_3 + Ca(OH)_2 + 2H_2O \rightarrow 2LiOH \cdot H_2O + CaCO_3 \quad (2)$$

$$LiOH \cdot H_2O + HCL \rightarrow LiCl + 2H_2O \qquad (3)$$

$$2LiOH \cdot H_2O + CO_2 \rightarrow Li_2CO_3 + 3H_2O \qquad (4)$$

This process, while both complex and costly, is conventionally utilized to obtain lithium chloride of sufficient purity for use in the electrolytic production of lithium metal from lithium chloride.

Lithium carbonate crystals precipitated from lithium chloride brines containing boron typically retain a contaminating quantity of lithium borate. One of the problems associated with borate ion in lithium brines is its solubility up to relatively high concentrations of 5,000 to 10,000 ppm as boron and four to five times that weight as borate, depending upon the particular borate ion species present (species vary with pH). For example, typical commercial lithium carbonate produced from brines at Silver Peak, Nevada and Chile contain approximately 400 ppm of boron, where the original lithium concentration was approximately 7,000 ppm and the boron concentration approximately 2,000 ppm. Lithium carbonate produced from such brines normally retains the borate contaminant. Therefore, precipitation of lithium carbonate is not an adequate means by which boron can be excluded from the resultant lithium salt.

A number of additional methods for boron removal have been used in the field of lithium metal manufacture. Among such methods include treatment of a brine with slaked lime to precipitate calcium borate and/or, where brines contain substantial magnesium impurities, magnesium borate. Attempts to absorb borates on clays, on $HCO_3-$ and Cl type resins, or on activated alumina in the presence of magnesium have also been employed to reduce the boron content of brines. Another unsatisfactory method is precipitating borate as a borophosphate concentrate by treating the brine with lime in combination with phosphoric acid. Brines have also been acidified to precipitate boric acid, and treated by solvent-solvent extraction, i.e. with n-butanol. None of these methods have proven to be cost effective for widespread commercial application.

As an example of efforts extant in the art to remove boron from lithium-containing brines, U.S. Pat. No. 4,261,960 discloses the removal of boron, as well as magnesium and sulfate, by treatment of the brine with an aqueous slurry of slaked lime and an aqueous solution of calcium chloride, followed by concentrating and eventual calcination.

In addition, other methods for removal of borates and boric acids from brines of Searles Lake are described in D. S. Arnold, "Process Control in Boric Acid Extraction", *Metallurgical Society Conferences,* Vol 49, 125–140, Gordon and Breach, Science Publishers, New York, (1968) [Hydrometallurgy Session, Second Annual Operating Conference, The Metallurgical Society of AIME, Philadelphia, Pa., Dec. 5-8, (1966)]. See, also, D. S. Arnold, "A New Process for the Production of Boric Acid", 19th Annual Technical Meeting, South Texas Section of AIChE, Galveston, Texas (October 23, 1964); C. R. Havighorst, "Kirkpatrick Award Winner/AP&CC's New Process Separates Borates from Ore by Extraction", *Chemical Engineering,* 70, 228–232 (Nov. 11, 1963. In addition other publications and U.S. patents on boric acid extraction date from 1960 on, including U.S. Pat. Nos. 2,969,275; 3,111,383; 3,297,737; 3,336,115; 3,370,093; 3,436,344; 3,479,294 and 4,261,961.

Other processes have been developed to remove boron from lithium chloride generated from brine sources. For example, U.S. Pat. No. 3,855,382 discloses the extraction of boron from magnesium chloride solutions using a solution of iso-octanol in petroleum ether. These processes are nevertheless costly for production or purification of lithium chloride with boron concentrations less than 25 ppm B. U.S. Pat. No. 4,271,131 and related U.S. Patent Nos. 4,243,392; 4,274,834; 4,261,960 teach the concentration of lithium chloride to about 40% by weight, followed by heating at high temperatures in excess of 200° C. to insolubilize the boron in an isopropanol solution which extracts purer lithium chloride, followed by evaporation of the isopropanol and crystallization of the lithium chloride. These processes involve a calcination step which is costly in terms of the operating cost and capital investment, due to the required materials of construction. In addition, yield losses are observed which increase the overall cost of the product.

There remains, therefore, a need in the art for a satisfactory, cost-effective method for production of a boron-free, highly pure lithium chloride from lithium-containing brines, which is satisfactory for electrolysis directly to lithium metal.

SUMMARY OF THE INVENTION

According to one aspect of the present invention, the inventors have discovered a novel method for the production of lithium chloride of a purity greater than 99% which has the potential to produce the world's lowest cost lithium metal.

The process involves substantially extracting boron from a lithium-containing brine by concentrating, and mixing the brine with an organic solution of a fatty alcohol in kerosene. The resulting aqueous solution phase containing boron-free lithium chloride is then subjected to evaporative crystallization at a temperature sufficient to precipitate anhydrous LiCl substantially free from contamination with magnesium salts in the brine. Evaporation below 100° C. produces mixed LiCl salts, such as $LiCl \cdot MgCl_2 \cdot 7H_2O$. This process crystallizes the solid anhydrous LiCl as a separate phase.

As an optional step in the method of this invention, the LiCl resulting from the above process can be washed and/or extracted with a low molecular weight alcohol, e.g., isopropyl alcohol, without preliminary calcination for boron removal Simple extraction of the lithium chloride with isopropyl alcohol substantially removes the less than 1% remaining contaminants in the LiCl product, while solubilizing the lithium chloride. The relatively pure lithium chloride-isopropanol solution is separated from the solid impurities and is then evaporated to crystallize a greater than 99.9% pure lithium chloride.

Another aspect of the present invention provides lithium chloride generated directly from brine by the processes of this invention. A great advantage of the lithium chloride produced by this method is that it contains no boron which might otherwise curtail production of lithium metal directly from lithium chloride produced from brine sources and is substantially purified from magnesium. This very pure lithium chloride is adapted for direct utilization in the electrolytic production of lithium metal and is also an excellent head feed for production of lithium chloride very low in other alkali and alkaline earth metals. This product is both relatively simple and economic to produce.

Other aspects and advantages of the present invention are described further in the following detailed description of preferred embodiments of the present invention.

DETAILED DESCRIPTION OF THE INVENTION

The present invention provides a novel process for producing a substantially pure lithium chloride compound from lithium-containing brine. This process is characterized by the step of crystallizing LiCl from a lithium containing source from which most of the boron or borate ion has been removed. The crystallized LiCl product of this process is characterized by a purity of greater than 99%, and is thus acceptable for a variety of uses including the electrolysis into lithium metal. For uses requiring greater than 99% purity, the process and resulting product of the crystallization may be further enhanced by an additional extraction step.

The starting material for the present process may be any lithium containing material, such as a natural brine, or a waste brine from other processes which contains a sufficient amount of lithium to make recovery of the lithium therefrom desirable from a cost effective basis. A presently preferred source of lithium for use in the process of this invention is a raw, natural lithium brine, such as that occurring in Silver Peak, Nev., U.S.A. and in the Salar de Atacama in northern Chile. These natural lithium-containing brines contain boron, usually in the form of borate ion and one or more other metals, usually in the form of chlorides or sulfates.

Before processing according to the present invention, the brine is desirably concentrated by solar evaporation in ponds, by heating or by other conventional means to a lithium concentration of from about 2 to about 7% by weight. Preferably for use in the present invention, the brine's lithium concentration is from about 4 to about 6.5% by weight.

As the brine is concentrated, substantially all of the free water is removed and the water remaining is essentially present as water of hydration. Removal of free water from the brine results in the saturation of the resulting "aqueous" phase with the metal salt hydrates present in the brine. For example, magnesium may be present as $MgCl_2$ hexahydrate; calcium may be present as $CaCl_2$ hexahydrate; strontium may be present as $SrCl_2$ hexahydrate. The lithium itself is present as LiCl trihydrate. The "aqueous" phase is, in a sense, a molten mixture of these metal hydrates at room temperature.

To accomplish this concentration with minimal lithium loss, any sulfate that might be present in the original brine is preferably substantially removed. The concentration of the brine, or at least the major portion thereof, is preferably conducted in the substantial absence of sulfate in the brine. Sulfate may be removed by conventional methods known to one of skill in the art, for example, by adding lime or $CaCl_2$ to precipitate gypsum, $CaSO_4.2H_2O$.

For effective use in the method of this invention, the brine should be sufficiently acidic, so that the boron is present as boric acid. Therefore, the concentrated brine will have a pH of about 1-2 when measured upon dilution with 10 volumes of water. A common acid, preferably one that will not produce contaminating precipitates, like HCl, HBr, $HNO_3$, and the like, may be used to adjust the pH of the brine to an acceptable range. The use of the chloride ion, as associated with hydrochloric acid, is preferred for this purpose.

Where the lithium containing brine also contains contaminating amounts of boron or borate ion, the first step of the present invention involves mixing the concentrated lithium brine with an organic solution, in kerosene, of a fatty alcohol insoluble in the melange of these metal salt hydrates. Such a fatty alcohol preferably contains from 6 to 16 carbon atoms. In a preferred embodiment, the fatty alcohol contains from 7 to 12 carbon atoms. Exemplary fatty alcohols for use in the process of this invention include, without limitation, branched chain hexanols, branched chain heptanols, lauryl alcohol, 2-ethylhexanol, iso-nonyl alcohol and iso-octyl alcohol. A presently preferred alcohol is iso-octyl alcohol.

The concentration of the alcohol in the kerosene according to this invention is desirably from about 5 to about 40%, by volume. A preferred alcohol concentration is from about 5 to about 20%, by volume.

In this boron-removing step, the relative proportion of organic solution to brine is between about 1 to about 5 to 1, by volume. Preferably this ratio is between about 2:1 and about 4:1, by volume. The presently most preferred ratio is 4:1.

The coefficient of extraction (i.e., the concentration of boron in the organic phase divided by the concentration of boron remaining in the aqueous or brine phase) determines the number of times the boron-removal extraction step will be repeated. However, the use of the lower concentrations of alcohol in the range may require the use of more extractions with the organic solution phase due to the reduced dissolution of boron by the alcohol. The upper figure of alcohol concentration, 40%, is dictated by the onset of significant dissolution of lithium into the organic phase. Hence, a presently preferred upper limit is about 20%.

Contact between the brine concentrate and the alcohol solution preferably involves agitation and counter current flow Mixing of the alcohol-kerosene solution with the brine concentrate results in a preferential dissolution of boron values into the organic phase as boric acid. Maximum extraction ordinarily takes place in a matter of about 1 to about 10 minutes/per pass at a temperature of from about 0° C. to about 50 C. In a preferred embodiment the temperature range for extraction is about 15° C. to about 40° C.

Following the extraction step of the present method, the organic phase containing the boron, which coalesces on the surface once the mixing during the extraction step is stopped, is physically separated from the aqueous phase (or raffinate) containing the lithium. After the extraction step has been repeated a sufficient number of times to allow removal of boron to be completed, the pH of the raffinate aqueous phase will be less than 4.7. If desired, the boron can subsequently be stripped from the organic phase with water by conventional means known to one of skill in the art and the organic phase may then be recycled for reuse. According to the present invention, the aqueous phase containing the boron-free lithium chloride rich brine resulting from the extraction of substantially all of the boron is then subjected to evaporation, under vacuum, at a temperature sufficient to crystallize up to about 90% of the lithium chloride in the aqueous phase. The temperature range for this step is from about 100° C. to about 140° C. Preferably the temperature ranges between about 105° C. to about 115° C. Most preferably the temperature employed for evaporating the aqueous phase from the naturally occurring brines is about 110° C. The vacuum under which this evaporation occurs ranges from about 590 mm Hg to about 760 mm Hg i.e. an absolute pressure of from about 0 mm Hg to about 170 mm Hg. A preferred vacuum range is from about 670 mm Hg to about 690 mm Hg i.e. an absolute pressure of from about 70 mm Hg to about 90 mm Hg).

Under the conditions of the evaporation step, the lithium chloride present in the aqueous phase crystallizes and precipitates as a separate anhydrous phase from the magnesium salts and other contaminants in the aqueous phase. Most of the magnesium and calcium present in the brine remain in solution The lithium chloride is separated from a saturated solution containing LiCl, $MgCl_2$, and $CaCl_2$ by a solid-liquid separation. Such a solid-liquid separation may desirably be enhanced by centrifugation.

The crystallized lithium chloride resulting from the practice of the method of this invention is in a form characterized by a purity greater than 99%. This greater than 99% pure lithium chloride can be electrolyzed directly by conventional methods to produce lithium metal for a variety of uses.

Where further purification of the LiCl is desirable, prior to electrolyzing, the lithium chloride product of this invention may be optionally washed and/or extracted with a low molecular weight alcohol.

In such additional purification steps, the 99% pure LiCl resulting from the method described above is preferably washed with hot original (feed) lithium brine or a saturated LiCl solution, at a temperature between about 105° C. and about 140° C. The temperature is most preferably between about 110° C. to about 130.C. The washed product may then be dried at a temperature of between about 105° C. and about 140° C. A more preferred range is between about 150° C. and about 170 C. The washed crystallized lithium chloride is then characterized by a purity of greater than 99%.

The LiCl thusly produced may be even further purified to remove the very small remaining contaminants by extraction in a low molecular weight alcohol, such as isopropanol. After removal of the solids, the isopropanol is evaporated to produce a greater than 99.9% pure LiCl. The conditions for such an optional extraction step can be those described in U.S. Pat. No. 4,274,834, which is incorporated by reference herein. Briefly described, this patent involves production of a dry salt at a temperature range of between 270°-325° C. This salt is then cooled and extracted with isopropanol. The drying temperature is needed to insolubilize the boron. However, the process described therein makes the LiCl more expensive to produce and not as effective as the present invention, which uses lower temperatures and removes the boron to about 1 ppm.

In the present invention, an evaporation step, such as described above, is applied to the LiCl-isopropanol solution to remove the isopropanol, resulting in a very pure crystallized LiCl product. Such a simple extraction removes any remaining sodium, potassium, rubidium, cesium, magnesium calcium strontium or barium contaminants from the now greater than 99.9% pure LiCl.

The present invention will be more readily understood from a consideration of the following specific examples which are provided for the purpose of illustration only and are not intended to limit the scope of the invention in any way.

EXAMPLE 1

A lithium brine obtained from the Salar de Atacama region of Chile is used as a starting material for the process of the present invention. This brine is characterized by the following analysis:

| | |
|---|---|
| Li | 0.15 (% by weight) |
| Na | 7.17 |
| K | 1.85 |
| Mg | 0.96 |
| Ca | 0.031 |
| $SO_4$ | 1.46 |
| Cl | 16.04 |
| Br | 0.005 |
| B | 0.04 |

Excess sulfate is removed from this brine by conventional precipitation with $CaCl_2$ as gypsum.

The brine is then concentrated by the well known process of solar evaporation to a lithium concentration of about 6.30%, by weight. During concentration insoluble salts, other than lithium, are formed and precipitate out of solution. The brine has a pH of about 6.5, measured upon dilution of the concentrated brine wi&h 10 volumes of water. Hydrochloric acid is used to adjust the pH to provide a resulting acidity of approximately pH 2. During the process of the present invention, sufficient acid is added to the brine to convert any borates into boric acid.

The concentrated brine is contacted with an organic solution of 20%, by volume, of iso-octyl alcohol in kerosene at an organic to brine ratio of about 4 to 1, by volume. After mixing the two phases thoroughly with vigorous stirring for about 4 minutes, boron is extracted from the aqueous phase into the organic phase. Upon standing, the organic phase, which is less dense than the aqueous phase, coalesces at the surface of this mixture. The remainder of the mixture, the aqueous phase or raffinate, settles to the bottom. The extraction coefficient of this process (i.e., the ratio of the weight percent of boron in the organic phase to the weight percent of boron in the aqueous phase) is between about 6 and about 14.

The organic phase, now containing the boron as boric acid, is removed and separated from the aqueous phase. The boron is stripped from the organic phase with water and the organic phase may be recycled for reuse.

As a result of three to four repeated multi-stage countercurrent extractions on the raffinate, the boron concentration in the aqueous phase (brine) is reduced from approximately 7,500 ppm to less than 5 ppm, and the resulting raffinate has a pH of less than 4.7.

The following data show the composition of the lithium brine before and after boron extraction:

TABLE I

| Chemical species | Brine | Brine after B Removal |
|---|---|---|
| Li | 6.30 | 6.03 |
| Na | 0.077 | 0.073 |
| K | 0.019 | 0.018 |
| Mg | 1.29 | 1.29 |
| Ca | 0.053 | 0.051 |
| B | 0.73 | 0.0001 |
| $SO_4$ | 0.016 | 0.019 |
| Cl | 5.86 | 34.46 |

The resulting boron-free brine is then evaporated at about 110° C. under a vacuum of 680 mm Hg i.e. an absolute pressure of 80 mm Hg, to crystallize lithium chloride. The crystallization step of the present invention allows precipitation of a single-phase anhydrous LiCl. The product is then separated from the high magnesium-containing mother liquor in a centrifuge. Some of the centrate is recycled to allow 90% of the LiCl to be recovered. The resulting dry unwashed LiCl was approximately 98.9%. The major impurities in this LiCl were approximately 0.5% NaCl and 0.6% $MgCl_2$.

This LiCl product was washed at a temperature of 130° C., and dried at 170° C., providing an LiCl product of approximately 99.2% purity.

EXAMPLE 2

To provide a basis for comparison, the product of the method of Example 1 [referred to in Table II below as Method I (boron-free feed brine with evaporative crystallization)] is compared to lithium chloride produced from the following other methods:

Method 2: from untreated brine containing boron subjected to evaporative crystallization;

Method 3: from boron-free brine subjected to 100% reduction to dryness; and

Method 4: from untreated brine subjected to 100% reduction to dryness.

The chemical purity of the products obtained for each method above is reported in Table II.

In the product generated by Method 1, the present invention, a recovery of 90% and an overall purity of 99.2% LiCl were obtained.

Method 2 also used an evaporative crystallizer to produce LiCl salt, but the presence of boron in the brine limited economic recovery of the LiCl to less than 90%. While production of salt from this brine was possible at 90% recovery, the purity of the product was not equivalent to that produced by Method 1.

Methods 3 and 4 involve production of salts from brines without an evaporative crystallizer. The technique used was recovery of 100% of the LiCl, without selective precipitation of a single LiCl phase. As a result, no purification resulted in the salt generation step. The difference in the two methods is that Method 3 uses brine treated for boron removal as a starting material, while all the boron was present in Method 4. The purity of the LiCl product in both cases was approximately 85%.

It is clear from the results that production of a purified LiCl containing approximately 99.2% LiCl is achieved by use of the present invention, which employs both the removal of boron from the brine prior to the removal of water, and evaporative crystallization under controlled conditions with a temperature greater than 100.5° C. to produce a single phase of LiCl. Production of this salt below 100° C. has been shown to generate a mixed hydrate of LiCl and $MgCl_2$ salts, $LiCl.MgCl_2.7H_2O$, that is not separable.

TABLE II

| Chemical Species | With B Removal Evap. Crystallized 90% Recovery* (Method 1) | Without B Removal Evap. Crystallized 90% Recovery* (Method 2) | With B Removal 100% Crystallized (Method 3) | Without B Removal 100% Crystallized (Method 4) |
|---|---|---|---|---|
| LiCl (dry basis) | 99.2% | 89.0% | 85.3 | 84.6 |
| Na | 0.17 | 0.16 | 0.197 | 0.16 |
| K | .0015 | 0.023 | 0.049 | — |
| Mg | 0.07 | 1.47 | 3.50 | 2.90 |
| Ca | 0.004 | 0.07 | 0.138 | 0.20 |
| B | <0.0001 | 0.43 | 0.0003 | 2.10 |
| $SO_4$ | 0.004 | 0.015 | 0.052 | — |
| Cl | 82.9 | — | — | — |
| $H_2O$ | 0.4 | — | 0.7 | — |

*90% of the lithium chloride input is recovered.

EXAMPLE 3

The following example illustrates the additional step of the method, employing a low molecular weight alcohol extraction. 50.0 grams salt (99.2% LiCl, from Example 1) was dissolved in 350 grams isopropanol and agitated at room temperature for 3–18 hours. After that time, the slurry was filtered. The isopropanol was removed by distillation, leaving behind a LiCl product of greater than 99.9% purity.

The impurities before and after this treatment are as follows:

| Chemical Analysis | Before Treatment | After Treatment |
|---|---|---|
| LiCl, % | 99.2 | 99.9 |
| Na, ppm | 1700 | 15–20 |
| Mg, ppm | 750 | 3–5 |
| Ca, ppm | 550 | 3–5 |

Numerous modifications and variations of the present invention are included in the above-identified specification and are expected to be obvious to one of skill in the art. For example, use of other appropriate boron-free lithium-containing brines processed by the steps of this invention may produce acceptably pure LiCl. Such modifications and alterations to the compositions and processes of the present invention are believed to be encompassed in the scope of the claims appended hereto.

What is claimed is:

1. The process of producing from a lithium-containing brine a substantially boron-free lithium chloride which comprises the steps of:
   (a) contacting a lithium chloride containing brine which contains from about 2 to about 7 weight percent lithium, is saturated with respect to metal salt hydrates present in the brine and is substantially free of free water with an organic solution of from about 5 to about 40% by volume of a fatty alcohol containing from 6 to 16 carbon atoms in kerosene at an organic solution to brine volume ratio of between about 1:1 and about 5:1, to extract boron from the brine into the organic solution phase;
   (b) separating said organic solution phase from said aqueous phase of said brine;

(c) evaporating the aqueous phase at a temperature above about 100.5° C. under a vacuum of from about 590 to 760 mm Hg to crystallize anhydrous lithium chloride, and (d) separating the crystallized anhydrous lithium chloride from the remaining aqueous phase.

2. The process of claim 1 wherein said brine is at a pH of about 1-2 measured when diluted with ten volumes of water.

3. The process of claim 2 wherein the lithium content of the concentrated brine is from about 4% to about 6.5% by weight.

4. The process of claim 1 further comprising removing from the brine substantially all sulfate.

5. The process of claim 1 wherein the amount of said fatty alcohol in said kerosene is between about 5 and about 20%, by volume.

6. The process of claim 1 wherein said fatty alcohol contains from 7 to 12 carbon atoms.

7. The process of claim 6 wherein said fatty alcohol is iso-octyl alcohol.

8. The process of claim 1 wherein the organic solution to brine volume ratio is between about 2:1 and about 4:1.

9. The process of claim 1 wherein the extraction of step (a) occurs at a temperature of between about 0° C. and about 50° C.

10. The process of claim 9 wherein said temperature is between 15° C. to about 40° C.

11. The process of claim 1 wherein the evaporating temperature is between 100.5° C. and 160° C.

12. The process of claim 11 wherein the evaporating temperature is between 110° C. to 135° C.

13. The process of claim 11 wherein said temperature is between 110° C. to about 115° C.

14. The process according to claim 1 wherein the vacuum pressure is from about 670 to about 690 mm Hg.

15. The process according to claim 1 wherein said separating step includes centrifuging said crystallized lithium chloride from contaminants in said aqueous phase.

16. The process according to claim 1 further comprising the step of washing said lithium chloride crystals at a temperature of between about 105° C. and about 130° C. and drying said crystals at a temperature of between about 105° C. and about 200° C.

17. The process of claim 1 or claim 2 wherein the amount of said fatty alcohol in said kerosene is between about 5 and about 20%, by volume; wherein said fatty alcohol contains from 7 to 12 carbon atoms; and wherein the organic solution to brine volume ratio is between about 2:1 and about 4:1.

18. The process of claim 1 further comprising extracting the crystallized LiCl in a solution of a low molecular weight alcohol and evaporating the alcohol therefrom.

19. The process of claim 16 further comprising extracting the crystallized LiCl in a solution of a low molecular weight alcohol and evaporating the alcohol therefrom.

20. The process of claim 18 wherein said alcohol is isopropyl alcohol.

21. The process of claim 19 wherein said alcohol is isopropyl alcohol.

* * * * *

UNITED STATES PATENT AND TRADEMARK OFFICE
CERTIFICATE OF CORRECTION

PATENT NO. : 4,980,136
DATED      : December 25, 1990
INVENTOR(S) : Patrick M. Brown and Susan J. Beckerman It is certified that error appears in the above–identified patent and that said Letters Patent is hereby corrected as shown below:

Col. 6, line 43, delete "50 C" and insert -- 50°C --;

Col. 6, line 64, delete "100°C" and insert -- 100.5°C --;

Col. 7, line 33, delete "130.C" and insert -- 130°C --;

Col. 7, line 35, delete "140°C" and insert -- 200°C --;

Col. 7, lines 36 and 37, delete "170 C" and insert -- 170°C --;

Col. 8, line 25, delete "wi&h" and insert -- with --;

Col. 10, Table II, last line, third column, delete "-" and
    insert -- 2.43 --.

Signed and Sealed this

Twenty-eighth Day of April, 1992

Attest:

HARRY F. MANBECK, JR.

Attesting Officer

Commissioner of Patents and Trademarks